United States Patent
Sinclair

(10) Patent No.: US 9,651,657 B2
(45) Date of Patent: May 16, 2017

(54) RADAR SURVEILLANCE SYSTEM

(71) Applicant: SELEX ES LTD, Basildon (GB)

(72) Inventor: Robert Longmuir Sinclair, Basildon (GB)

(73) Assignee: LEONARDO MW LTD, Essex (GB)

( * ) Notice: Subject to any disclaimer, the term of this patent is extended or adjusted under 35 U.S.C. 154(b) by 204 days.

(21) Appl. No.: 14/390,964

(22) PCT Filed: Mar. 19, 2013

(86) PCT No.: PCT/EP2013/055715
§ 371 (c)(1),
(2) Date: Oct. 6, 2014

(87) PCT Pub. No.: WO2013/149828
PCT Pub. Date: Oct. 10, 2013

(65) Prior Publication Data
US 2015/0061916 A1    Mar. 5, 2015

(30) Foreign Application Priority Data
Apr. 5, 2012   (GB) .................................. 1206176.8

(51) Int. Cl.
*G01S 7/41*    (2006.01)
*G01S 13/42*   (2006.01)

(52) U.S. Cl.
CPC ............ *G01S 7/414* (2013.01); *G01S 13/426* (2013.01)

(58) Field of Classification Search
CPC ................................ G01S 7/414; G01S 13/426
(Continued)

(56) References Cited

U.S. PATENT DOCUMENTS 4,118,703 A    10/1978  Williams
4,357,608 A *  11/1982  Lewis .................... G01S 13/87
                                                    342/155

(Continued)

FOREIGN PATENT DOCUMENTS

EP    2 363 728 A1    9/2011
GB    1 514 341 A     6/1978
(Continued)

OTHER PUBLICATIONS

International Search Report (PCT/ISA/210) mailed on Jun. 21, 2013, by the European Patent Office as the International Searching Authority for International Application No. PCT/EP2013/055715.

(Continued)

*Primary Examiner* — Peter Bythrow
*Assistant Examiner* — Helena Seraydaryan
(74) *Attorney, Agent, or Firm* — Buchanan Ingersoll & Rooney PC

(57) ABSTRACT

A radar surveillance system is described in which the radar beam re-visits each area of interest after a short period of time, by electronically reconfiguring a scanned beam to an offset position for an interleaved sub-dwell, within a scan period. This 'look-back' capability, where the area under test is re-visited after approximately 1 second, allows the natural de-correlation of sea clutter to take place between the initial and look-back samples of the surveillance area. The re-visit time can be adjusted to best exploit the de-correlation characteristics of the sea clutter return.

13 Claims, 2 Drawing Sheets

(58) Field of Classification Search
USPC .......................................................... 342/41
See application file for complete search history.

(56) References Cited

U.S. PATENT DOCUMENTS

| | | | |
|---|---|---|---|
| 5,262,785 A * | 11/1993 | Silverstein | G01S 13/522 342/162 |
| 2002/0109630 A1 | 8/2002 | Law | |
| 2010/0156700 A1 | 6/2010 | Barbaresco et al. | |

FOREIGN PATENT DOCUMENTS

| GB | 2 397 957 A | 8/2004 |
|---|---|---|
| WO | WO 2005/052630 A3 | 6/2005 |

OTHER PUBLICATIONS

Written Opinion (PCT/ISA/237) mailed on Jun. 21, 2013, by the European Patent Office as the International Searching Authority for International Application No. PCT/EP2013/055715.

* cited by examiner

RADAR SURVEILLANCE SYSTEM

The invention relates to a radar surveillance system. More specifically but not exclusively it relates to maritime surveillance radar designed to detect small targets.

In maritime surveillance radar, the key objective is to distinguish actual targets from apparent targets. Apparent targets, or 'false alarms' are those that may be caused, by a radar reflection of the sea surface being categorised as a potential target, when no real object is present. This problem has been the subject of much research over the past 70 years. The problem is essentially achieving a robust decision criterion, based on the mathematical probability that a particular reflection from the area under surveillance is or is not a target.

In conventional maritime surveillance radars, the antenna produces a fixed beam shape, which is scanned over the area of interest, up to and including complete 360° coverage, in the azimuth plane.

Such systems then use non-coherent azimuth integration of amplitude information reflected from this area of interest to determine the threshold for declaration of target or not. Typical existing processing schemes to statistically address this question include, but are not limited to, thresholding the data after area averaging, applying an M out of N detection criteria, or thresholding post azimuth filtering. In such maritime radar detection, the key discriminant is the amplitude correlation of the target, if present, during the dwell time, compared with the amplitude correlation of the background sea clutter return. Hence if both target and sea clutter returns are each highly correlated, a mathematically sound, automatic test hypothesis is difficult, if not impossible to achieve. This results in either many false targets being displayed or real targets being suppressed. Both conditions are unacceptable as operator workload and search time can become excessive in trying to achieve the functional role of target detection.

There are a number of known systems that will be described below. However, all suffer from problems that the present invention aims to overcome.

The exploitation of the differences between target amplitude temporal de-correlation and sea clutter amplitude temporal de-correlation is not a new feature in radar mode design. However the existing modes that benefit from a delay in time between looks on a specific dwell area all compromise the operation of the radar and hence target detection performance. This is further described under each existing mode type, with key factors relating to the specific impact on performance.

Fast Scan.

In this implementation the 360° (or limited scan) is achieved by an antenna, rotating around an azimuth gimbal at a rate that enables a re-visit of an area rapidly, typically every 1 or less seconds. The radar returns are then processed across two or more scans to achieve the necessary clutter temporal de-correlation. There are two main drawbacks of this implementation. Firstly, the physical aspect of rotating a large mass at high angular velocity creates problems, from the difficulty in achieving reliability to the gyroscopic impact on an airborne host platform (helicopter or fixed wing aircraft). Secondly, due to the high angular rotation rate, the number of radar pulses or PRIs in each look or dwell can be as low as one. Hence a large number of scans is needed to achieve target integration above a detection threshold and whilst this may result in the required target/clutter discrimination, the time taken to capture this number of scans, together with the very short exposure time per scan, can result in a small fleeting target being missed, due to obscuration of sea swell or the short exposure of targets such as a periscope. There are also other considerations relating to the complexity of range walk correction due to the large number of scan periods required to make a target decision.

Slow Scan

This can be implemented with an antenna azimuth angular rate that is slow enough to allow the temporal de-correlation of sea clutter within the dwell time on target. Again this mode compromises the opportunity to 'see' the fleeting target as the time to cover the 360° scene is long (typically 10's of seconds), to allow de-correlation within the dwell period.

Scan to Scan

Another existing compromise approach involves, for example, scanning the maritime scene, at an azimuth rate of say between 60°/s and 120°/s, integrating within each dwell but achieving the necessary clutter de-correlation by comparing a batch of scans in a scan to scan fashion. Again, this only offers performance on large targets which appear stationary during the period of scan to scan integration. This is not a practical mode for operation against the fleeting small target such as a periscope, small boat or a person in adverse sea conditions.

The present invention relates to the use of novel scan strategy, with interleaved dwell periods, which uses a technique to enhance the probability of detection of fleeting targets in adverse sea clutter conditions.

According to the invention there is provided a maritime surveillance radar system for detecting targets comprising an electronically scanned radar antenna, the antenna beam having look back modes and interleaved dwell periods spaced over time, such that signal returns indicative of clutter may be identified independently of signal returns generated by targets thereby improving the detectability of the targets in sea clutter.

According to the invention there is further provided a method of improving the detectability of targets in sea clutter comprising the steps of scanning an area under surveillance with an electronically scanned radar antenna and re-scanning each area of interest after a short period of time, by electronically reconfiguring the scanned beam to an offset position for an interleaved sub-dwell, within a given scan period, such that signal returns indicative of clutter may be identified independently of signal returns generated by targets, thereby improving the detectability of the targets in sea clutter.

Preferably, this is achieved by employing an electronically scanned antenna. Preferably, the system offers a mode design that can be implemented in a manner that does not degrade either the look time or the search capability of the radar, as is the case with current techniques as described above. Furthermore, the present invention offers additional degrees of freedom to further enhance target detection and additional rejection of clutter returns, as this mode is compatible with inclusion of pulse to pulse frequency agility or sub-dwell frequency agility and also the implementation of sub-dwell fixed frequency coherent processing.

The present invention preferably includes the use of an electronically scanned radar antenna (E-Scan antenna) and associated processing in a maritime surveillance role. The invention offers enhanced target discrimination against sea clutter, particularly for small or fleeting targets such as small boat detection, man-overboard scenarios, life raft searches or submarine periscopes.

Preferably, the implementation supports up to all round (or 360°) coverage from a host platform either through the use of multiple fixed E-Scan antennas or the use of one or more E-Scan Antenna(s) mounted on an azimuth gimbal system, which allows the antenna(s) to rotate physically up to 360°.

Furthermore, the invention exploits specific natural characteristics of potential targets and of sea clutter to offer an improved ability to discriminate one from the other, increasing the probability of target detection in a short exposure time and reduced false alarms. In a practical role, such as search & rescue, this reduces workload for radar operators. In a military role, the enhanced performance reduces false searches, saving wasted time & unnecessary reactions to apparent threats.

The present invention aims to overcome the problems of the prior art systems and provide a maritime surveillance radar system capable of more accurately discriminating between false alarms and real targets.

One particular implementation of the invention will now be described with reference to the accompanying diagrammatic drawings, in which FIG. 1 shows the conventional application of a scanning antenna in a maritime surveillance application, FIG. 2 shows a schematic of one form of maritime radar surveillance system in accordance with the invention implemented with an E scan radar having interleaved dwells implemented through a combination of electronic and mechanical scanning.

Figure 1:
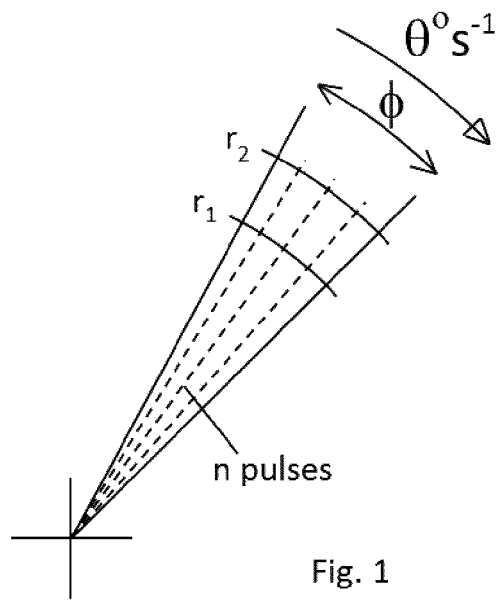

FIG. 1 shows the conventional application of a scanning antenna in a maritime surveillance application, where θ is the mechanical scan rate and φ is the azimuth antenna beamwidth. The dwell period is gated in the range $r_1$ to $r_2$ in azimuth by φ and number of pulses (PRI). In this application the beam shape (determined by the physical antenna attributes) and the range sampling clock can be used to determine an area of interest, for the declaration of a target or not, within that search sub-area. Typically this is an area of a few degrees in azimuth and a number of range gates down the length of an imaginary 'spoke'. At any moment in the azimuth scan of the antenna beam, a number of radio frequency (RF) pulses illuminate this dwell angle, dependent on the designed pulse repetition rate of the radar and the azimuth scan rate.

In the first embodiment of the invention, the difference in approach over existing systems is that whilst in a conventional surveillance radar the scanning beam sequentially covers the area of interest, in terms of a dwell period and a range swath (see FIG. 1), in the present invention the radar beam re-visits each area of interest after a short period of time, by electronically reconfiguring the scanned beam to an offset position for an interleaved sub-dwell $1_s$, $2_s$, within the scan period. (see FIG. 2). This 'look-back' capability, where the area under test is re-visited after approximately 1 second, allows the natural de-correlation of the sea clutter to take place between the initial and look-back samples of the surveillance area. Of course those skilled in the art will note that the re-visit time can be adjusted to best exploit the de-correlation characteristics of the sea clutter return. The enhanced de-correlation of the sea clutter improves the ability of the radar to reject false targets whilst still maintaining the ability to integrate target returns within the sub-dwell periods to achieve a satisfactory probability of detection.

The approach described here, where a number of sub-dwell periods $1_s$, $2_s$ may be used to illuminate the same dwell patch, but spaced in time, allows further degrees of freedom to be exploited.

Figure 2:
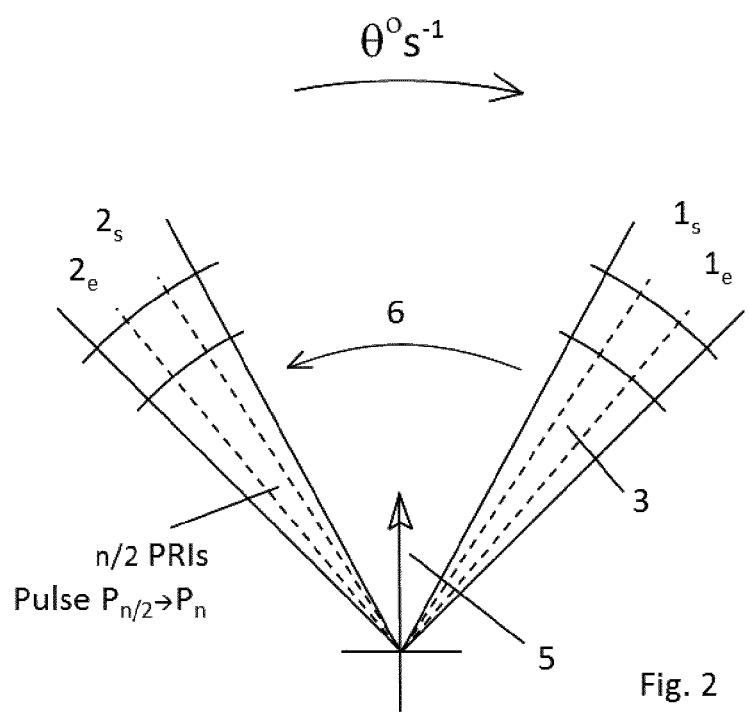
Figure 3:
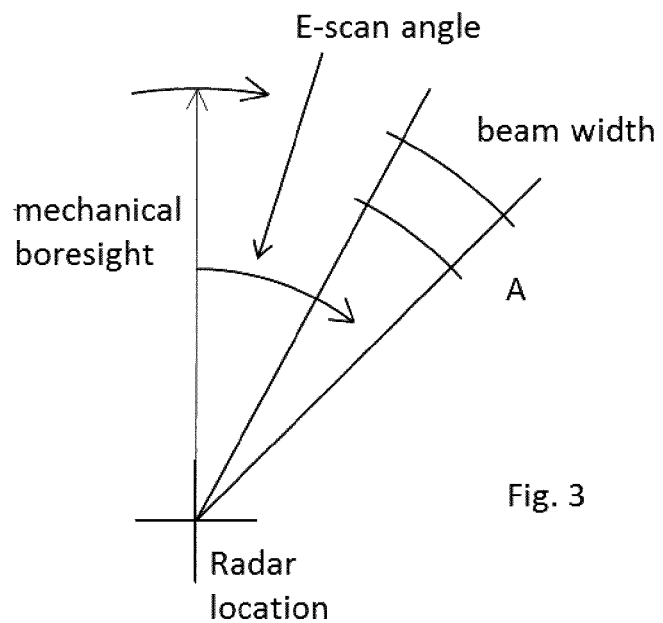
FIG. 3 shows a schematic of the radar system of FIG. 2 at a time T1.
Figure 4:
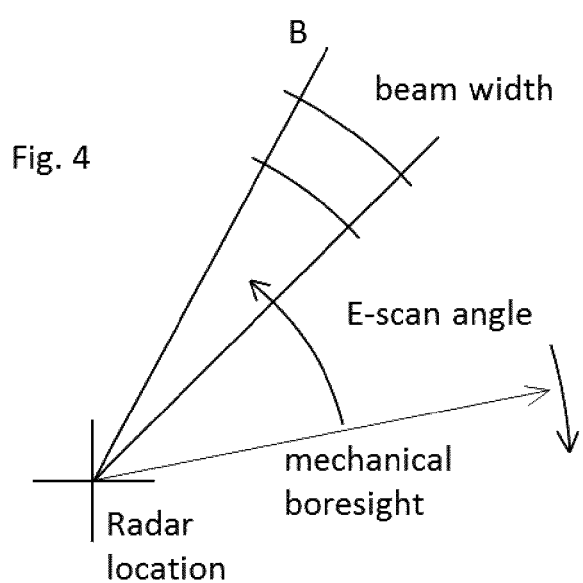
FIG. 4 shows a schematic of the radar system of FIG. 3 at a time of T1 plus (typically) 1 second.

With reference to FIGS. 2, 3 and 4, where A and B are the same geographical location, and considering a maritime surveillance mode operating in unambiguous, low pulse repetition frequency (PRF) mode. The antenna, which in the first embodiment is a rotating antenna with the capability to be electronically steered in two dimensions, rotates (clockwise from above) on a gimbal axis, through the Z plane, giving 360° coverage.

The azimuth mechanical scan rate is defined as θ°/s (nominally, say, 60°/s). The dwell time, defined by the azimuth scan rate, radar PRF and beamwidth, contains n pulses. The E-scan antenna has, for example, two pre-set beam angles $1_e$, $2_e$ around the mechanical boresight 5 of +ø° and −ø° and this E-Scan boresight 5 can be switched from one to the other of these angles in one pulse repetition interval (PRI). Hence the antenna can offer a look-back angle 6 of 2ø°, which equates to a nominal 1 second re-visit time if, for example, ø=30°.

So, in a typical design, consider one dwell time of the mechanically rotating antenna, at an E-Scan offset of +30°, with a dwell of n/2 pulses. The antenna is then reconfigured, within one PRI, to look back −60° and then illuminate the look-back dwell area for n/2 pulses or PRIs. The antenna is then reset to the +30° E-Scan position and this sequence is continuously cycled, whereby every dwell is eventually made up from two sub dwells of n/2 pulses 3, separated in time by (scan rate/ E-Scan offset)° which are processed together, having been time tagged, and a target decision made.

It will be appreciated by those skilled in the art that the sub-dwell, containing a number of radar pulses or PRIs, can contain pulses of different frequencies (frequency agility), offering maximum clutter amplitude de-correlation.

Moreover, it will be appreciated that the sub-dwells $1_s$ and $2_s$ can alternately be coherent processing intervals, using a fixed frequency for sub-dwell 1 and a different fixed frequency for sub-dwell 2. This offers some clutter de-correlation in amplitude terms, between dwell 1 and 2, and also enables any differential Doppler of the target compared with sea clutter to be exploited in the decision process.

Furthermore, it will be appreciated that this coherent waveform plan allows target to clutter discrimination using the relatively narrow target Doppler spectrum against the relatively wide clutter spectrum.

It will be appreciated that the use of interleaved sampling and 'look-back' beam management, spaced in the time domain, allows the temporal de-correlation of sea clutter returns to be fully exploited which hence offers improved target detection and false alarm regulation by exploiting this natural temporal clutter de-correlation.

Furthermore, the ability to use coherent or non-coherent dwells, spaced in time, maximises the opportunity to discriminate the target from sea clutter, by processing both in the amplitude & Doppler domain.

In this way, the Maritime Surveillance Radar of the present invention having small target look-back mode with interleaved dwells, offers an optimised capability for the search of fleeting objects in adverse sea conditions, using a mode which exceeds the capability of currently implemented designs. The mode design enables full exploitation of the three mechanisms of (1) the natural temporal de-correlation of sea clutter, (2) the de-correlation endowed by frequency agility and (3) the use of Doppler discrimination in the target detection decision of the target. This is a unique feature of the present invention.

In operational terms this mode offers optimised performance for the detection of small, fleeting targets such as small boats, semi-submersible vessels, submarine periscopes, people in the search & rescue role, and other similar targets of interest.

It will be appreciated that, whilst the invention relates to maritime surveillance it is intended for the surveillance of maritime areas. The radar antenna itself may be mounted on any suitable platform, such as, but not limited to, an aeroplane, ship, or other vehicle. Furthermore, the radar antenna may be shore based.

The invention claimed is:

1. A maritime surveillance radar system for detecting targets, comprising:
  an electronically scanned radar antenna, the antenna beam being configured to scan an area of interest from a first position, and configured with look back modes having interleaved dwell periods spaced over time, such that signal returns indicative of clutter will be identified independently of signal returns generated by targets to address detectability of targets in sea clutter,
  wherein for each look back mode, after a period of time the antenna is reset to a second position and rescans the area of interest via the interleaved dwell periods.

2. A system according to claim 1 in which the dwell periods are coherent or non-coherent and spaced apart in time to discriminate target and sea clutter returns.

3. A system according to claim 1 comprising:
  a processor for processing returns in amplitude and Doppler domains.

4. A system according to claim 1 comprising:
  a gimbal axis for mechanical steering of the electronically scanned radar antenna.

5. A method of detecting targets in sea clutter, the method comprising:
  scanning an area of interest under surveillance with a scanning beam from a first position and an electronically scanned radar antenna; and
  re-scanning each area of interest after a period of time within a given scan period, by electronically reconfiguring the scanned beam to an offset position for an interleaved sub-dwell period, such that signal returns indicative of clutter will be identified independently of signal returns generated by targets to detect the targets in sea clutter.

6. A system according to claim 1 in which the antenna is mounted on a platform, the platform being an aeroplane, ship or shore-based vehicle.

7. A system according to claim 2 comprising:
  a processor for processing returns in amplitude and Doppler domains.

8. A system according to claim 7 comprising:
  a gimbal axis for mechanical steering of the electronically scanned radar antenna.

9. A system according to claim 8 in which the antenna is mounted on a platform, the platform being an aeroplane, ship or shore-based vehicle.

10. A method according to claim 5, wherein the antenna is mounted on a platform, the platform being an aeroplane, ship or shore-based vehicle.

11. A system according to claim 1, wherein the period of time is at most one second.

12. A system according to claim 1, wherein the first position is set to an angle $\phi$ about a boresight of the antenna, and in the look back mode the second position is set to an angle $2\phi$).

13. A system according to claim 12, wherein each dwell period of the antenna includes a plurality of pulses and within a respective dwell period the antenna is configured to rescan the area of interest after being reset to the second position.

* * * * *